United States Patent Office 3,053,980
Patented Sept. 11, 1962

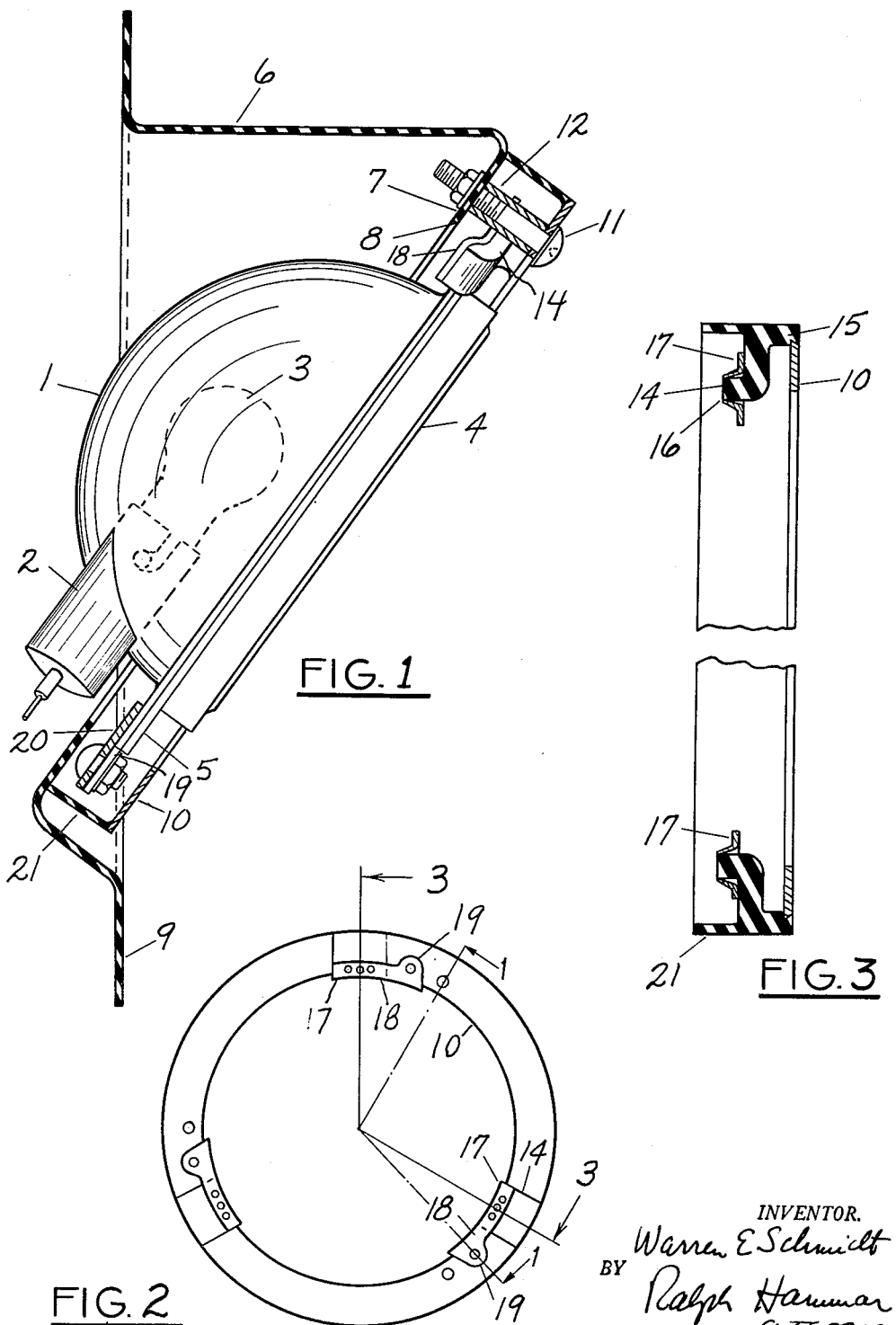

3,053,980
LAMP SUPPORT
Warren E. Schmidt, Erie, Pa., assignor to Lord Manufacturing Company, Erie, Pa., a corporation of Pennsylvania
Filed July 29, 1960, Ser. No. 46,210
3 Claims. (Cl. 240—90)

This invention is a lamp support adapted for use in aircraft and in other environments subject to vibration.

In the drawing, FIG. 1 is a side elevation of a lamp in section on line 1—1 of FIG. 2, FIG. 2 is a rear view of the lamp support ring, and FIG. 3 is a section on line 3—3 of FIG. 2.

In the drawing, the lamp has a reflector 1 with a socket 2 for a lamp bulb 3 and a lens 4 suitably clamped to the rim 5 of the reflector. The back of the reflector is enclosed within a housing 6 having at its front a rim 7 defining an opening 8 through which the reflector projects and having at its back a mounting flange 9 for attachment to a wall or other supporting surface. The parts so far decribed are typical of lights used in aircraft and in other locations where the vibration level is such that bulb replacement is a problem.

To eliminate bulb replacement caused by vibration, the lamp is not directly mounted on the rim 7 but instead is carried by a supporting ring 10 spaced in front of the rim and fixed thereto by bolts 11 and spacers 12. At a plurality of points around the periphery of the ring are Z-shaped resilient elements 14 of natural or synthetic rubber with one end 15 of the Z bonded to the ring 10 and the other end 16 of the Z bonded to one end 17 of a bracket 18. At the opposite end of each of the brackets 18 is an ear 19 which is bolted to a lug 20 fixed to the rim 5 of the reflector 1. The Z-shaped rubber elements 14 have substantially equal resistance to forces applied in any direction between the ends and provide a resilient connection between the lamp and the supporting ring substantially equally effective in all directions. This isolates the lamp from vibration and eliminates the bulb replacement problem.

The appearance of the lamp is not destroyed by the resilient mounting. At the outer edge of the supporting ring 10 is bonded a rubber flange 21 which bridges the space between the supporting ring 10 and the rim 7 on the lamp supporting housing 6. The flange 21 is preferably integral with the outer edge of the Z-shaped rubber elements 14 and molded at the same time as the mountings. The flange 21 is thin walled and yields readily so that it does not interfere with the vibration isolation provided by the elements 14.

If the rubber elements should break or become disconnected from the ring 10 or the brackets, the lamp could not fall out of its support. No matter in which direction the lamp moves, the rim 5 of the lamp is stopped by engagement with the spacers 13 and the lugs 20 are stopped by the rim 7 or by the ring 10, as the case may be.

What is claimed as new is:
1. In a lamp support having a rim with an opening into which a lamp is recessed, said lamp having a reflector with a rim in front of said opening, a plurality of spacers projecting in front of the rim of the support and surrounding the rim of the reflector and serving as stops limiting the excursion of the reflector, a supporting ring mounted on the spacers in front of the rim, a plurality of Z-shaped rubber elements spaced around the ring and with one end of each element bonded to the ring, a bracket bonded to the other end of each element, said elements having substantially equal resistance to forces applied in any direction between the ends, a plurality of lugs on the lamp, one fastened to each bracket, the ends of said lugs being between and opposite the rim of the support and said ring in all positions of the reflector and acting as stops to hold the lamp in place upon failure of said rubber elements, and a rubber flange bonded to said ring and bridging the space between the rim and ring.

2. In a lamp support having a rim surrounding an opening into which a lamp is recessed, a supporting ring mounted on and spaced in front of the rim, a plurality of Z-shaped rubber elements spaced around the ring between the ring and rim and with one end of each element fastened to the ring, a bracket fastened to the other end of each element, said elements having substantially equal resistance to forces applied in any direction between the ends, a lug on the lamp fastened to each bracket, and a rubber flange fastened to and surrounding said ring and bridging the space between the rim and ring.

3. In a lamp support having a rim with an opening into which a lamp is recessed, said lamp having a reflector with a rim in front of said opening, a plurality of spacers projecting in front of the rim of the support and surrounding the rim of the reflector and serving as stops limiting the excursion of the reflector, a supporting ring mounted on the spacers in front of the rim, a plurality of Z-shaped rubber elements spaced around the ring and with one end of each element bonded to the ring, a bracket bonded to the other end of each element, said elements having substantially equal resistance to forces applied in any direction between the ends, a plurality of lugs on the lamp, one fastened to each bracket, the ends of said lugs being between and opposite the rim of the support and said ring in all positions of the reflector and acting as stops to hold the lamp in place upon failure of said rubber elements.

References Cited in the file of this patent
UNITED STATES PATENTS

| | | |
|---|---|---|
| 2,352,591 | Wallerstein | June 27, 1944 |
| 2,368,166 | Sheldrick et al. | Jan. 30, 1945 |
| 2,606,241 | Steinke | Aug. 5, 1952 |
| 2,685,641 | McDowell | Aug. 3, 1954 |
| 2,724,770 | Onksen | Nov. 22, 1955 |
| 2,762,908 | Gaither | Sept. 11, 1956 |